United States Patent
Nussenblatt et al.

(10) Patent No.: US 10,173,770 B2
(45) Date of Patent: Jan. 8, 2019

(54) CYLINDRICAL ELASTOMERIC BEARING WITH TAPERED SHIMS

(71) Applicant: Sikorsky Aircraft Corporation, Stratford, CT (US)

(72) Inventors: Eric Lucien Nussenblatt, Stamford, CT (US); David H. Hunter, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/512,784

(22) PCT Filed: Sep. 17, 2015

(86) PCT No.: PCT/US2015/050666
§ 371 (c)(1),
(2) Date: Mar. 20, 2017

(87) PCT Pub. No.: WO2016/048783
PCT Pub. Date: Mar. 31, 2016

(65) Prior Publication Data
US 2017/0297691 A1    Oct. 19, 2017

Related U.S. Application Data

(60) Provisional application No. 62/053,343, filed on Sep. 22, 2014.

(51) Int. Cl.
*F16C 27/06* (2006.01)
*B64C 27/35* (2006.01)
(Continued)

(52) U.S. Cl.
CPC .............. *B64C 27/35* (2013.01); *B64C 27/54* (2013.01); *F16C 17/10* (2013.01); *F16C 27/02* (2013.01);
(Continued)

(58) Field of Classification Search
CPC .... F16C 27/063; F16C 27/2326; F16C 27/43; F16F 1/40; F16F 1/403; F16F 1/406; F16F 1/41
(Continued)

(56) References Cited

U.S. PATENT DOCUMENTS 2,760,359 A * 8/1956 Wildhaber ............ F16C 27/063
464/120
4,063,787 A 12/1977 Bakken et al.
(Continued)

OTHER PUBLICATIONS

ISR/WO, Issued Dec. 17, 2015, PCT Application No. PCT/US15/50666, 11 pages.

*Primary Examiner* — Phillip A Johnson
(74) *Attorney, Agent, or Firm* — Cantor Colburn LLP

(57) ABSTRACT

A cylindrical elastomeric bearing including a plurality of elastomeric layers arranged about a central bore. The elastomeric layers are characterized by a middle portion having a first thickness and two outer portions having a second thickness, the second thickness being greater than the first thickness, the one or more elastomeric layers being tapered between the middle portion and the outer portions. One or more shim layers, each of the plurality of shim layers being arranged between two of the plurality of elastomeric layers. The shim layers are shaped to fit with the elastomer layers.

13 Claims, 6 Drawing Sheets

(51) Int. Cl.
*B64C 27/54* (2006.01)
*F16C 33/22* (2006.01)
*F16C 17/10* (2006.01)
*F16C 27/02* (2006.01)

(52) U.S. Cl.
CPC ............ *F16C 27/063* (2013.01); *F16C 33/22* (2013.01); *F16C 2202/08* (2013.01); *F16C 2240/60* (2013.01); *F16C 2326/43* (2013.01)

(58) Field of Classification Search
USPC ........................................................ 384/221
See application file for complete search history.

(56) References Cited

U.S. PATENT DOCUMENTS

| | | | |
|---|---|---|---|
| 4,194,372 A * | 3/1980 | Hannibal | ................ F16D 3/76 464/59 |
| 4,232,563 A | 11/1980 | Peterson et al. | |
| 4,714,450 A | 12/1987 | Byrnes et al. | |
| 4,765,758 A | 8/1988 | O'Donnell et al. | |
| 5,297,874 A | 3/1994 | Raines | |
| 6,293,871 B1 * | 9/2001 | Geislinger | ................ F16D 3/76 464/57 |
| 8,511,997 B2 | 8/2013 | Cunningham et al. | |
| 2013/0084186 A1 | 4/2013 | Sottiaux et al. | |
| 2014/0255191 A1 | 9/2014 | Jarrett et al. | |

\* cited by examiner

CYLINDRICAL ELASTOMERIC BEARING WITH TAPERED SHIMS

This application claims the benefit of PCT Application No. PCT/US15/50666, filed on Sep. 17, 2015, which in turn claims priority to U.S. provisional patent application Ser. No. 62/053,343, filed Sep. 22, 2014. The entire contents of PCT Application No. PCT/US15/50666 and U.S. provisional patent application Ser. No. 62/053,343 are incorporated herein by reference.

BACKGROUND

The present disclosure relates generally to an elastomeric bearing and, more particularly, to cylindrical bearings for rotor devices and systems.

Cylindrical elastomeric bearings are used in many applications. Cylindrical elastomeric bearings typically include alternating layers of elastomeric material and metallic or composite shims. These bearings often replace non-lubricated or self-lubricated bearings such as Teflon fabric lined bearings. Typical aerospace elastomeric bearing applications include spherical rod end bearings for pitch control rods and dampers, spherical blade retention bearings for fully articulated rotors, and cylindrical bearings for semi-articulated rotors and fluid-elastic damper seals. Some cylindrical elastomeric bearings are exposed to both axial and radial loads. Elastomer layers tend to bulge at the edges due to radial and bending moment loads going through the bearing. These shear stresses are a limitation on the size of the bearing and can require significant growth of a bearing size in order to achieve an adequate design. Accordingly, the industry is receptive to innovations that extend the life of cylindrical elastomeric bearings, particularly those that are exposed to both radial and axial loads.

SUMMARY

Disclosed herein is a cylindrical elastomeric bearing having a plurality of elastomeric layers arranged about a central bore. The elastomeric layers are characterized by a middle portion having a first thickness and two outer portions having a second thickness, the second thickness being greater than the first thickness. The one or more elastomeric layers are tapered between the middle portion and the outer portions. One or more shim layers are arranged between two of the plurality of elastomeric layers.

In addition to one or more of the features described above, or as an alternative, in further embodiments, wherein each of the one or more shims is tapered to fit with the one or more elastomeric layers being tapered.

In addition to one or more of the features described above, or as an alternative, in further embodiments, wherein the one or more elastomeric layers are tapered on one side and are flat on one side.

In addition to one or more of the features described above, or as an alternative, in further embodiments, wherein the one or more elastomeric layers are tapered on a radially inward facing side.

In addition to one or more of the features described above, or as an alternative, in further embodiments, wherein at least one of the elastomeric layers is tapered frustoconically.

In addition to one or more of the features described above, or as an alternative, in further embodiments, wherein at least one of the elastomeric layers is tapered frustospherically.

In addition to one or more of the features described above, or as an alternative, in further embodiments, wherein the second thickness is at least 10% greater than the first thickness.

In addition to one or more of the features described above, or as an alternative, in further embodiments, wherein the second thickness is at least 20% greater than the first thickness.

Another aspect of the disclosure provides a cylindrical elastomeric bearing having a plurality of elastomeric layers arranged about a central bore and a plurality of shim layers, each of the shim layers being arranged between two of the elastomeric layers. The shim layers have a radially inward facing side that is substantially uniform in diameter. A radially outward facing side of the shim layers is tapered between a middle section and two outer sections, the middle section having a first thickness and the outer sections having a second thickness, the first thickness being greater than the second thickness.

In addition to one or more of the features described above, or as an alternative, in further embodiments, wherein at least one of the plurality of shim layers is tapered frustoconically.

In addition to one or more of the features described above, or as an alternative, in further embodiments, wherein at least one of the plurality of shim layers is tapered frustospherically.

In addition to one or more of the features described above, or as an alternative, in further embodiments, wherein the second thickness is at least 10% greater than the first thickness.

In addition to one or more of the features described above, or as an alternative, in further embodiments, wherein the second thickness is at least 20% greater than the first thickness.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to rotor systems for rotary wing aircraft, whereas the advantages of the present disclosure as applied in a related field would be apparent to one having ordinary skill in the art and are considered to be within the scope of the present invention.

Figure 1:
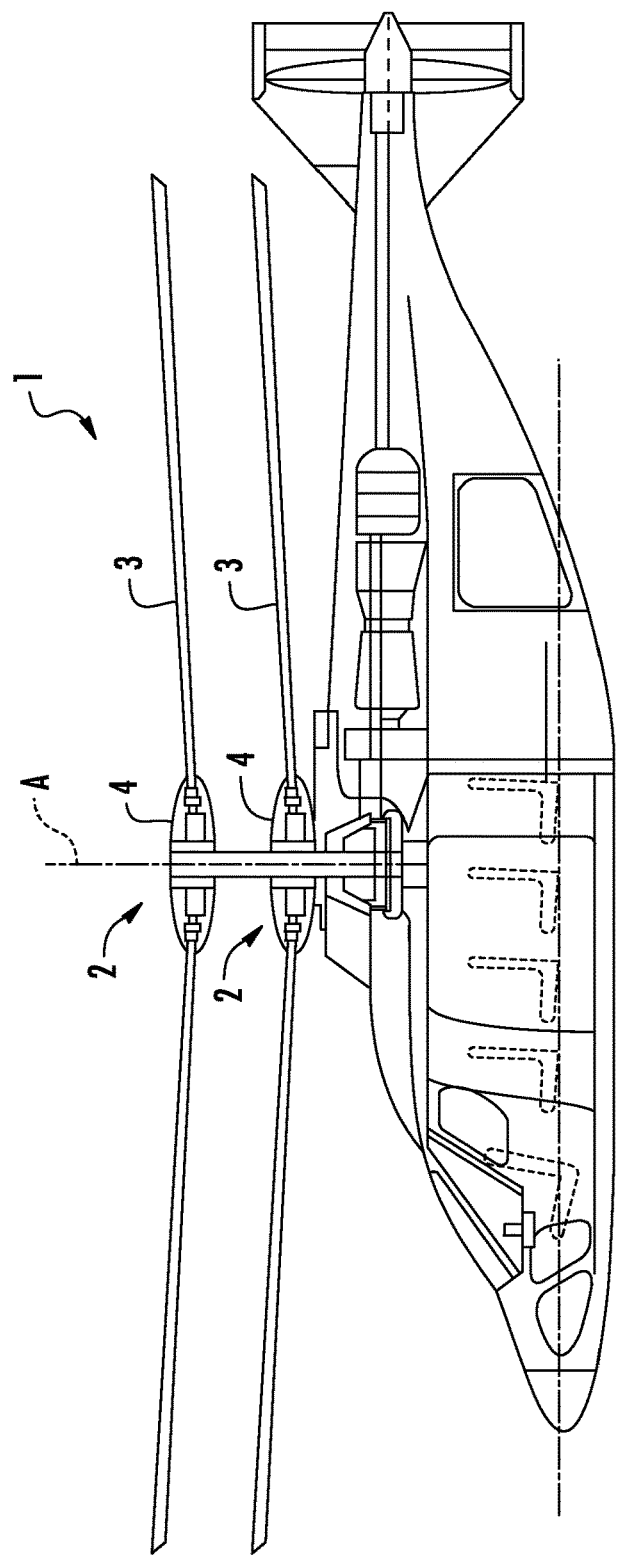
FIG. 1 is a side view of a rotary wing aircraft according to one embodiment.

FIG. 1 illustrates a rotary wing aircraft 1 according to an aspect of the present disclosure. The aircraft 1 includes a rotor system 2 for rotating a plurality of rotor blades 3 about an axis of rotation A. The rotor hub 4 connects the plurality of blades to the rotor system 2. The cylindrical elastomeric bearing of the present disclosure may be used in connection with any rotary wing aircraft 1 or any device in which rotational motion is included. By way of example, while shown in the context of a coaxial rotorcraft having two sets of counter rotating blades, aspects could be used in conventional single axis rotorcraft, fixed wing aircraft, wind turbines, maritime applications, automotive applications and/or applications in which cylindrical bearings are used. As will be apparent to those in the art, the present disclosure will be particularly useful where the cylindrical elastomeric bearing is subject to shearing stresses due to axial and radial loads.

Figure 2A:
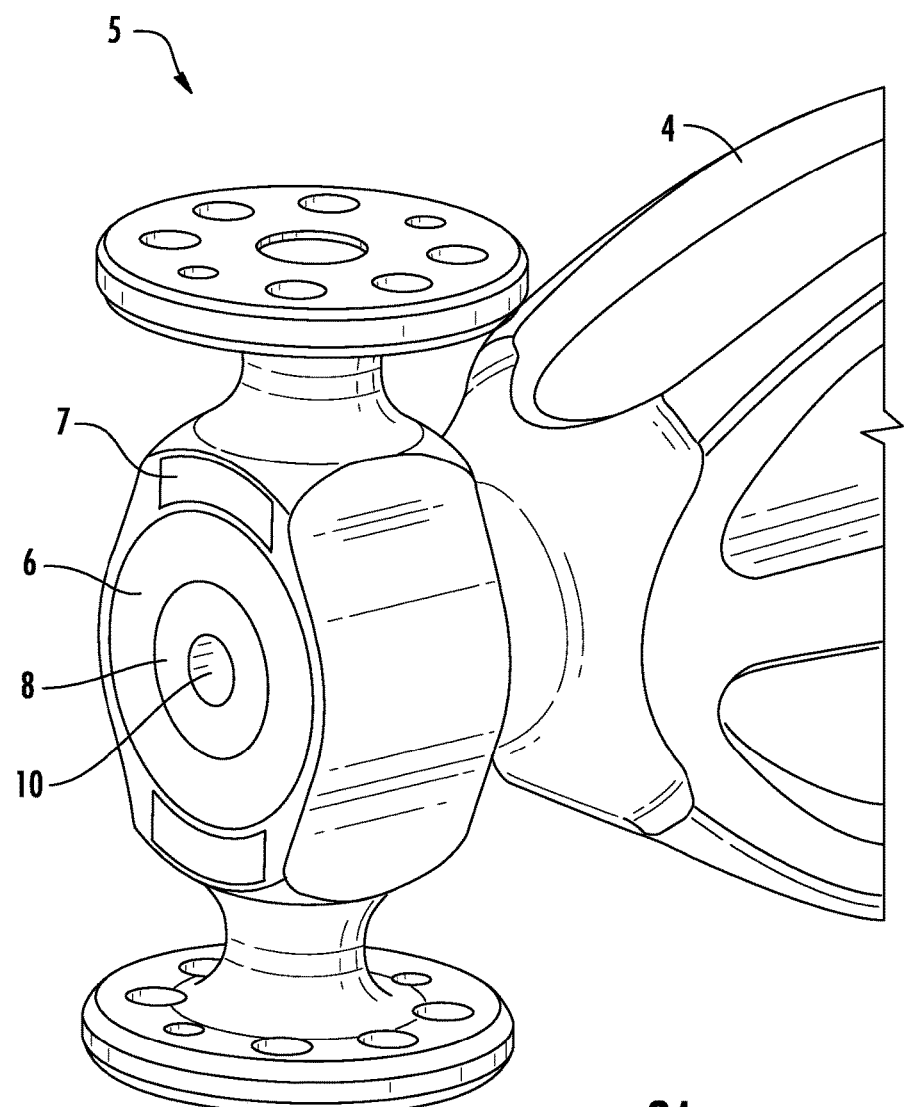
FIG. 2A is an illustration of a rotary device according to another embodiment.
Figure 2B:
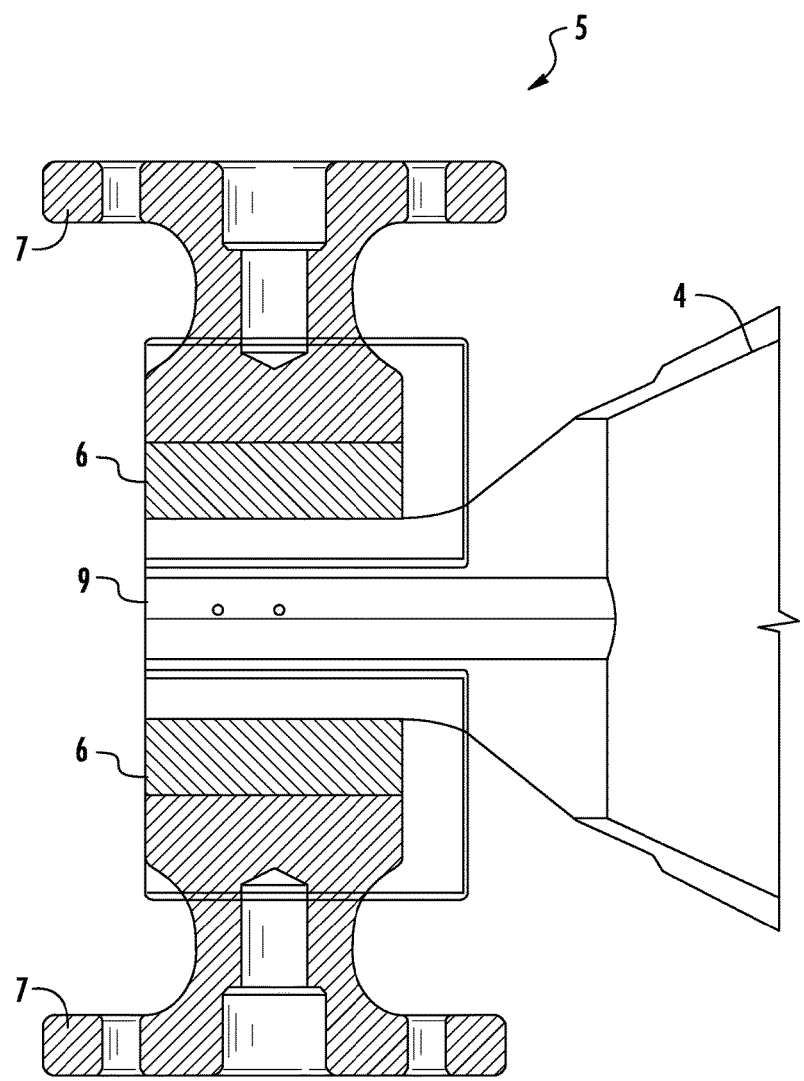
FIG. 2B is a sectioned side view of the rotary device shown in FIG. 2A.

FIGS. 2A and 2B illustrate a rotary device 5, (i.e., a pitch control device for a rotary wing aircraft), that employs a cylindrical elastomeric bearing 6 of an aspect of the present disclosure. The rotary device 5 includes a mounting bracket 7 that attaches to the rotor blades 3 (see FIG. 1). The mounting bracket 7 is attached to the hub 4 via the cylindrical elastomeric bearing 6, an inner sleeve 8, and a control rod 9 arranged in a central bore 10 of the cylindrical elastomeric bearing 6. In operation, the pitch of the rotor blades 3 is controlled by turning the control rod 9, thereby defining a pitch control axis.

Figure 3A:
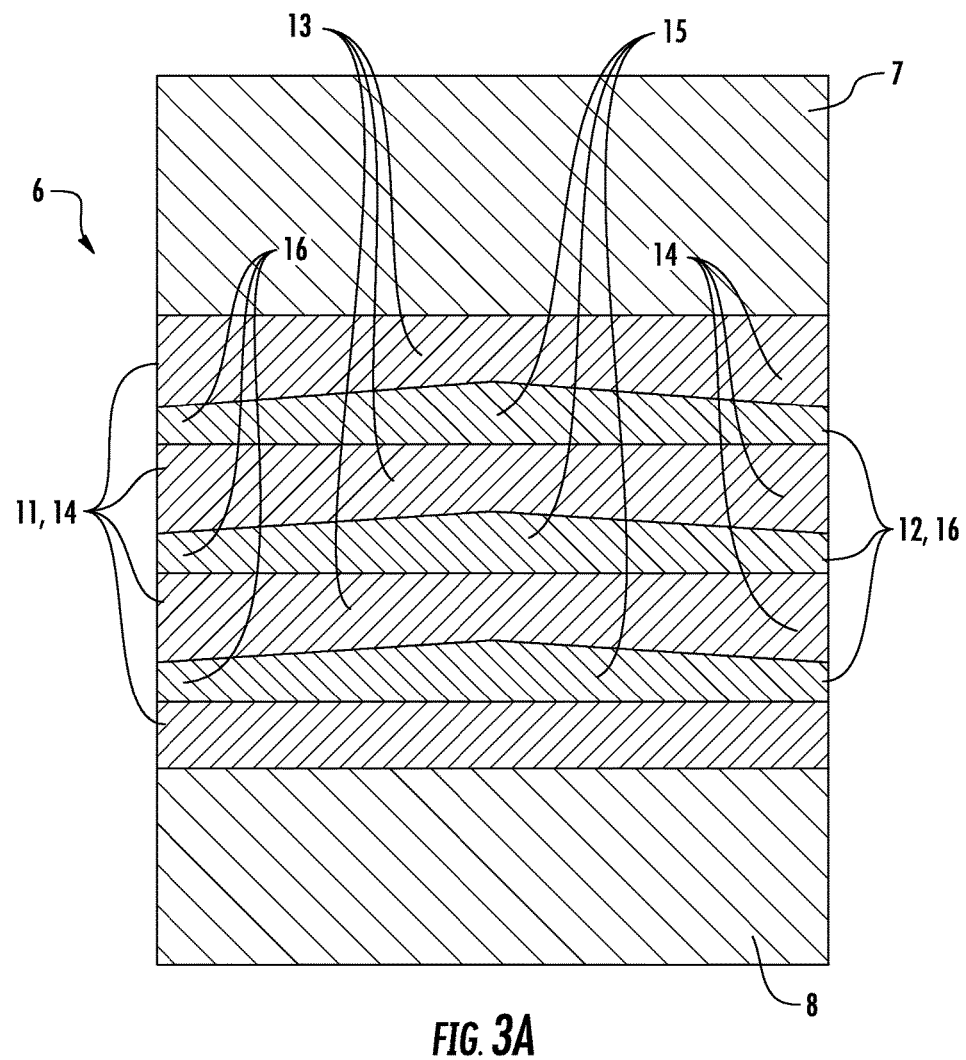
FIGS. 3A-3C are sectioned partial side views of a cylindrical elastomeric bearing according to another embodiment.
Figure 3B:
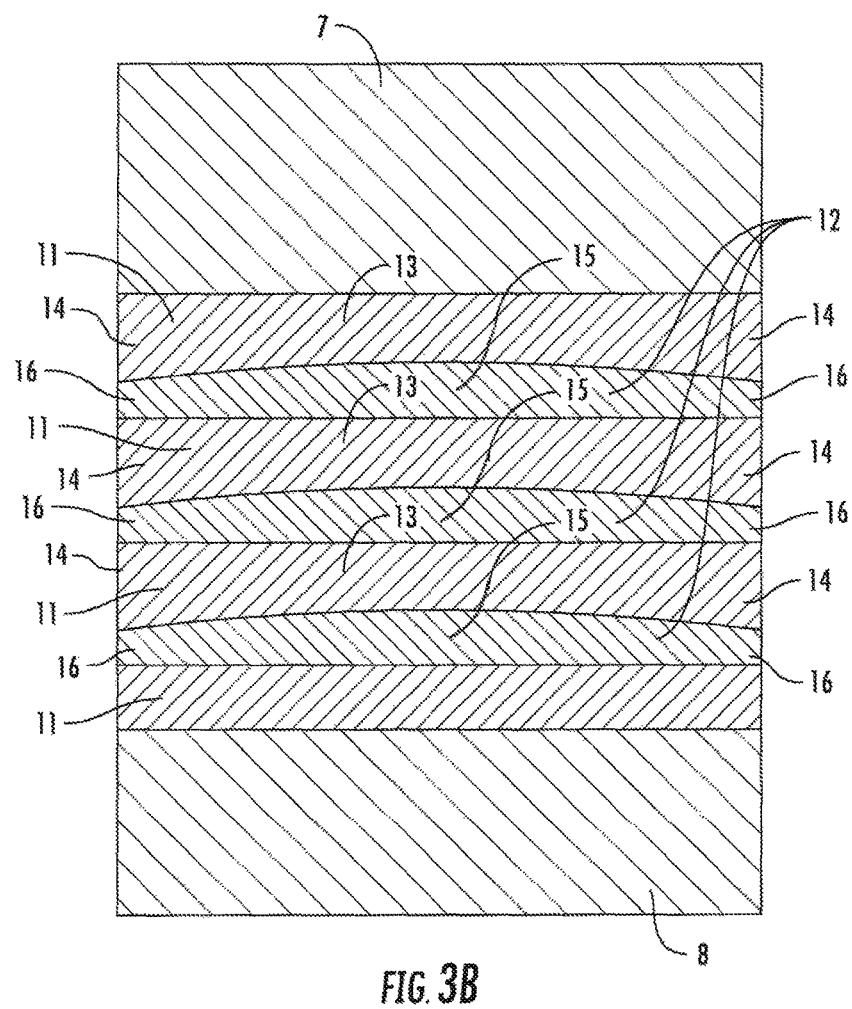
Figure 3C:
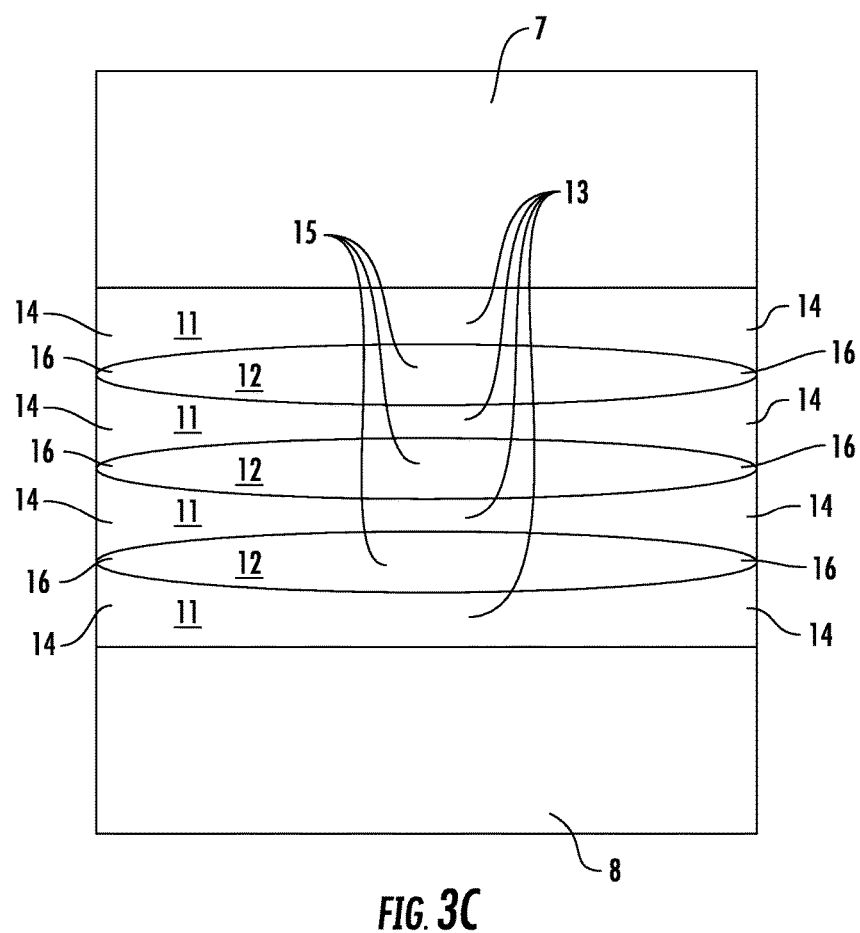

Axial and radial forces are exerted on the bearing 6, in part, by the centrifugal force of the rotor blades 3 in motion and the weight of the rotor blades 3. FIGS. 3A-3C illustrate various configurations of the cylindrical elastomeric bearing 6, and the elastomer layers 11 and shim layers 12 contained therein, that improve the resiliency of the bearing 6 under the shear stresses that result from the axial and radial forces. As shown in FIGS. 3A-3C, the elastomeric layers 11 are arranged about the central bore 10 (not shown, see FIG. 2A), and have a middle portion 13 with a first thickness and outer portions 14 with a second thickness, the second thickness being greater than the first thickness. The inner sleeve 8 separates the innermost elastomer layer 11 from the central bore 10 (see FIG. 2A). An outermost elastomer layer 11 is against an outer sleeve, which may, for example, form a portion of the mounting bracket 7 or another structure.

As shown in FIGS. 3A-3C, the "middle" portion is defined as the portion that is either roughly half of the length of the elastomer layer 11 in a longitudinal direction or the thinnest portion of the elastomer layer 11. Similarly, the "middle" section of the shim layers 12 is defined as the portion that is either roughly half of the length of the shim layer 12 in the longitudinal direction or the thickest portion of the shim layer 12. While shown with the longitudinal axis substantially parallel with the pitch axis, it is understood that the longitudinal axis could be in other directions in other implementation of aspects of the invention.

As shown in FIGS. 3A and 3B, the shape of the elastomer layers 11 may be flat (cylindrical) on a radially outward facing side, i.e., having a substantially constant diameter. Between the middle portion 13 and the outer portions 14, the elastomer layers 11 are tapered, i.e., there is a gradual change in the thickness of the elastomer layers 11 between the middle portion 13 and the outer portions 14. The tapering of the elastomer layers 11 may be frustoconical, as shown in FIG. 3A, frustospherical, as shown in FIG. 3B, or some other shape, e.g., parabolic, etc. In some cases, the thickness of the outer portions 14 of the elastomer layers 11 is at least 10% greater than the thickness of the middle portion 13. In other examples, the outer portions 14 have a thickness that is greater than the middle portion 13 by at least 20%.

The shim layers 12 are shaped to complement the shape of the elastomer layers 11. For example, each of the shim layers 12 has a middle section 15 that is thicker than outer sections 16. As shown in FIGS. 3A and 3B, the shim layers 12 may be configured to have a radially inward facing side that is substantially flat, i.e., cylindrical. The radially outward facing side of the shim layers 12 is tapered, similar to the elastomer layers 11 described above. The tapering of the shim layers 12 may be, for example, frustoconical, as shown in FIG. 3A, frustospherical, as shown in FIG. 3B, or some other shape (e.g., parabolic, elliptical, curvilinear, etc.). In some cases, the thickness of the middle section 15 of the shim layers 12 is greater than a thickness of the outer sections 16 by at least 10%. In further embodiments, the thicknesses differ by at least 20%. The shim layers 12 may be constructed of a metallic or other rigid material. For example, the shim layers 12 may be steel, fiber composite, titanium, or another material known in the art.

FIG. 3C illustrates an alternative embodiment in which the shim layers 12 are tapered on both a radially inward facing surface and a radially outward facing surface. This results in the elastomer layers 11 having an hourglass shape except at the surfaces adjacent to the bracket 7 and the inner sleeve 8. As will be apparent to those in the art, many other configurations are possible.

The arrangement of elastomer layers 11 and shim layers 12 as discussed herein minimizes the shear stresses at the outer portions 14 of the elastomer layers due to the thickening of the elastomer layers 11. This is beneficial for bending loads in the bearing. Under such loads, the outer portions of the elastomeric layers 11 tend to bulge if the layers 11 lack tapering, greatly increasing the shear stresses as a result. However, the bulging of elastomeric layers 11 is decreased where the layers increase in thickness towards the outer portions, which necessarily leads to a reduction in shear stresses. In some examples, this configuration may theoretically reduce the shear stresses in the elastomer by 25-35%. Shear stresses in the shim layers 12 may also be reduced by about 15%. These reductions in shear stresses correlate to increased lifespan of the cylindrical elastomeric bearing 6.

Further, the features of the present disclosure may be used to improve other configurations of cylindrical elastomeric bearings. For example, cylindrical elastomeric bearings where the elastomer layers are constructed with uniform thickness, wherein the durometer of the elastomer layers is varied to compensate for the thickening described above may also benefit from the present disclosure. In particular, the tapering of elastomer layers described above will further reduce the shears stresses in the elastomer compared to changing durometer alone.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A component for a rotary wing aircraft comprising:
   a rotor hub;
   a pitch control device supported by the rotor hub;
   a cylindrical elastomeric bearing having a longitudinal axis supported by the pitch control device, the cylindrical elastomeric bearing comprising:
     a plurality of elastomeric layers layered radially outward from a central bore extending in a longitudinal direction along the longitudinal axis, at least one of the elastomeric layers comprising a tapered elastomeric layer comprising:
       a middle portion having a first thickness at a location substantially in a middle of the central bore in the longitudinal direction; and
       two outer portions having a second thickness, the second thickness being greater than the first thickness, the one or more elastomeric layers being tapered between the middle portion and the outer portions along the longitudinal direction, wherein the second thickness is at least 10% greater than the first thickness; and
     one or more shim layers extending in the longitudinal direction, each of the plurality of shim layers separating pairs of the plurality of elastomeric layers.

2. The component of claim 1, wherein each of the one or more shims is tapered to fit with the tapered elastomeric layer.

3. The component of claim 1, wherein the tapered elastomeric layer is tapered on one side and is flat on an opposing side.

4. The component of claim 3, wherein the tapered elastomeric layer is tapered on a radially inward facing side closest to the central bore.

5. The component of claim 1, wherein the tapered elastomeric layer is tapered frustoconically.

6. The component of claim 1, wherein the tapered elastomeric layer is tapered frustospherically.

7. The component of claim 1, wherein the second thickness is at least 20% greater than the first thickness.

8. A rotary wing aircraft comprising the component of claim 1.

9. A component for a rotary wing aircraft comprising:
   a rotor hub;
   a pitch control device supported by the rotor hub; and
   a cylindrical elastomeric bearing supported by the pitch control device, the cylindrical elastomeric bearing comprising:
     a plurality of elastomeric layers layered radially outward from a central bore extending in a longitudinal direction along a longitudinal axis; and
     a plurality of shim layers extending in the longitudinal direction, each of the plurality of shim layers comprising a tapered layer that is arranged between two of the plurality of elastomeric layers, each of the plurality of shim layers having a radially inward facing side that is substantially uniform in diameter and a radially outward facing side that is tapered between a middle section and two outer sections along the longitudinal direction, the middle section arranged at a location substantially in a middle of the central bore in the longitudinal direction, the middle section having a first thickness and the outer sections having a second thickness, the first thickness is at least 10% greater than the second thickness.

10. The component of claim 9, wherein at least one of the plurality of shim layers is tapered frustoconically.

11. The component of claim 9, wherein at least one of the plurality of shim layers is tapered frustospherically.

12. The component of claim 9, wherein the second thickness is at least 20% greater than the first thickness.

13. A rotary wing aircraft comprising the component of claim 9.

* * * * *